United States Patent
Woodward (10) Patent No.: US 9,391,435 B2
(45) Date of Patent: Jul. 12, 2016

(54) CABLE STRIPPER AND CUTTING ASSEMBLY FOR STRIPPING A CABLE

(71) Applicant: GREENLEE TEXTRON INC., Rockford, IL (US)

(72) Inventor: William Woodward, Kirkland, IL (US)

(73) Assignee: TEXTRON INNOVATIONS INC., Providence, RI (US)

( * ) Notice: Subject to any disclaimer, the term of this patent is extended or adjusted under 35 U.S.C. 154(b) by 106 days.

(21) Appl. No.: 14/501,204

(22) Filed: Sep. 30, 2014

(65) Prior Publication Data

US 2015/0089815 A1    Apr. 2, 2015

Related U.S. Application Data

(60) Provisional application No. 61/884,341, filed on Sep. 30, 2013.

(51) Int. Cl.
*H02G 1/12*    (2006.01)
*F16K 31/122*    (2006.01)

(52) U.S. Cl.
CPC ............ *H02G 1/1226* (2013.01); *F16K 31/122* (2013.01)

(58) Field of Classification Search
CPC ............................ H02G 1/1226; F16K 31/122
USPC .................................................. 30/90.1–91.2
See application file for complete search history.

(56) References Cited

U.S. PATENT DOCUMENTS

| | | | | |
|---|---|---|---|---|
| 2,437,514 A * | 3/1948 | Givens | ................. | H02G 1/1229 30/90.7 |
| 2,624,221 A * | 1/1953 | Schneider | ............ | H02G 1/1265 30/90.4 |
| 3,377,891 A * | 4/1968 | Horrocks | ............. | H02G 1/1226 30/90.1 |
| 3,398,610 A * | 8/1968 | Matthews | ............ | H02G 1/1226 30/90.1 |
| 3,433,106 A * | 3/1969 | Matthews | ............ | H02G 1/1226 81/9.41 |
| 3,533,313 A * | 10/1970 | Matthews | ............ | H02G 1/1226 30/457 |
| 3,566,466 A * | 3/1971 | Matthews | ............ | H02G 1/1226 144/30 |
| 4,449,298 A * | 5/1984 | Putz | ..................... | H02G 1/1226 30/90.1 |
| 4,769,910 A * | 9/1988 | Noon | .................... | H02G 1/1226 29/2.16 |
| 4,858,315 A * | 8/1989 | Tanner | ................. | H02G 1/1226 30/90.4 |
| 5,511,305 A * | 4/1996 | Garner | ................. | H02G 1/1226 29/828 |
| 5,673,486 A * | 10/1997 | Brown | ................. | H02G 1/1224 30/90.1 |
| 5,956,852 A * | 9/1999 | Tarpill | ................. | H02G 1/1226 30/90.1 |
| 6,095,693 A | 8/2000 | Fujiwara | | |
| 6,381,850 B1 * | 5/2002 | Warner | ................. | H02G 1/1229 30/90.4 |
| 6,530,152 B1 * | 3/2003 | Christensen | ......... | H02G 1/1226 30/90.1 |

(Continued)

FOREIGN PATENT DOCUMENTS

FR    2 901 643 A1    11/2007

OTHER PUBLICATIONS

European Search Report and Written Opinion for EP 14186736.6 dated Jun. 3, 2015, 8 pages.

*Primary Examiner* — Sean Michalski
(74) *Attorney, Agent, or Firm* — Klintworth & Rozenblat IP LLC (57) ABSTRACT

A tool formed of a cable stripper and an associated cutting assembly is used for stripping a cable. Differently sized cutting assemblies can be easily and quickly mounted to and disassembled from the cable stripper. The cable stripper includes a depth stop assembly for setting the amount of cable seated within the cable stripper so that the cutting assembly is positioned in the desired position. The cable stripper include a one-way bearing which only allows the user to use the cable stripper in the intended direction.

13 Claims, 10 Drawing Sheets

(56) References Cited

U.S. PATENT DOCUMENTS

| | | | |
|---|---|---|---|
| 6,581,291 B1 | 6/2003 | Tarpill | |
| 6,622,386 B2 * | 9/2003 | Miller | H01R 43/28 30/278 |
| 6,668,458 B1 * | 12/2003 | Schoenleber | H02G 1/1221 30/500 |
| 7,160,351 B2 | 1/2007 | Trasorras et al. | |
| 7,171,753 B2 * | 2/2007 | Korczak | H02G 1/1224 30/90.1 |
| 7,984,553 B1 | 7/2011 | Miller | |
| 2002/0040529 A1 * | 4/2002 | Merle | B23B 5/167 30/289 |
| 2002/0124410 A1 * | 9/2002 | Tarpill | H02G 1/1226 30/90.1 |
| 2003/0110635 A1 * | 6/2003 | Holland | H02G 1/1224 30/90.1 |
| 2004/0221456 A1 * | 11/2004 | Losinger | H02G 1/1226 30/90.1 |
| 2005/0000094 A1 * | 1/2005 | Laux | B23D 29/023 30/90.3 |
| 2005/0066528 A1 * | 3/2005 | Ducret | H02G 1/1297 30/90.2 |
| 2005/0115074 A1 * | 6/2005 | Gialenios | H01B 11/1834 30/90.1 |
| 2009/0019704 A1 * | 1/2009 | Ehret | H02G 1/1224 30/90.1 |
| 2010/0269637 A1 * | 10/2010 | Wirth | H02G 1/1265 81/9.51 |
| 2011/0010945 A1 * | 1/2011 | Delafosse | B26D 3/08 30/90.9 |
| 2013/0042483 A1 * | 2/2013 | Ducret | H02G 1/1229 30/90.7 |
| 2013/0055571 A1 * | 3/2013 | Nugent | H02G 1/1224 30/90.1 |
| 2014/0090538 A1 * | 4/2014 | Makrides-Saravanos | G02B 6/245 83/861 |

* cited by examiner

CABLE STRIPPER AND CUTTING ASSEMBLY FOR STRIPPING A CABLE

This application claims the benefit of U.S. Provisional Application Ser. No. 61/884,341, filed on Sep. 30, 2013, which is incorporated herein by reference in its entirety.

BACKGROUND OF THE INVENTION

Cable strippers for stripping a sheath of a cable from the wires within the cable are known. A coaxial cable is generally constructed with a single inner copper conductor having an inner insulation, and a very thin aluminum ground shield surrounding the inner insulation. A tough metal braid surrounds the shield in order to protect the shield and to provide further shielding for the inner conductor. The cable further includes an outer jacket which is normally made of polyethylene. The end of the cable must be stripped down to the inner conductor to terminate the end of the cable to an electrical connector. A sharp blade is used to cut the end of the cable.

SUMMARY OF THE INVENTION

A tool in accordance with some example embodiments includes a cable stripper and a cutting assembly attached thereto. A tool formed of a cable stripper and an associated cutting assembly is used for stripping a cable. Differently sized cutting assemblies can be easily and quickly mounted to and disassembled from the cable stripper. The cable stripper includes a depth stop assembly for setting the amount of cable seated within the cable stripper so that the cutting assembly is positioned in the desired position. The cable stripper include a one-way bearing which only allows the user to use the cable stripper in the intended direction.

This Summary is provided merely for purposes of summarizing some example embodiments so as to provide a basic understanding of some aspects of the disclosure. Accordingly, it will be appreciated that the above described example embodiments are merely examples and should not be construed to narrow the scope or spirit of the disclosure in any way. Other embodiments, aspects, and advantages of various disclosed embodiments will become apparent from the following detailed description taken in conjunction with the accompanying drawings which illustrate, by way of example, the principles of the described embodiments.

BRIEF DESCRIPTION OF THE DRAWINGS

The organization and manner of the structure and operation of the disclosed embodiments, together with further objects and advantages thereof, may best be understood by reference to the following description, taken in connection with the accompanying drawings, which are not necessarily drawn to scale, wherein like reference numerals identify like elements in which.

DETAILED DESCRIPTION OF THE ILLUSTRATED EMBODIMENTS

While the invention may be susceptible to embodiment in different forms, there is shown in the drawings, and herein will be described in detail, a specific embodiment with the understanding that the present disclosure is to be considered an exemplification of the principles of the invention, and is not intended to limit the invention to that as illustrated and described herein. Therefore, unless otherwise noted, features disclosed herein may be combined together to form additional combinations that were not otherwise shown for purposes of brevity. It will be further appreciated that in some embodiments, one or more elements illustrated by way of example in a drawing(s) may be eliminated and/or substituted with alternative elements within the scope of the disclosure.

A tool formed of a cable stripper 20 and an associated cutting assembly 22 is used for stripping a cable (not shown). The cutting assembly 22 is used to cut the cable seated in the cable stripper 20. Differently sized cutting assemblies can be easily and quickly mounted to and disassembled from the cable stripper 20.

Figure 1:
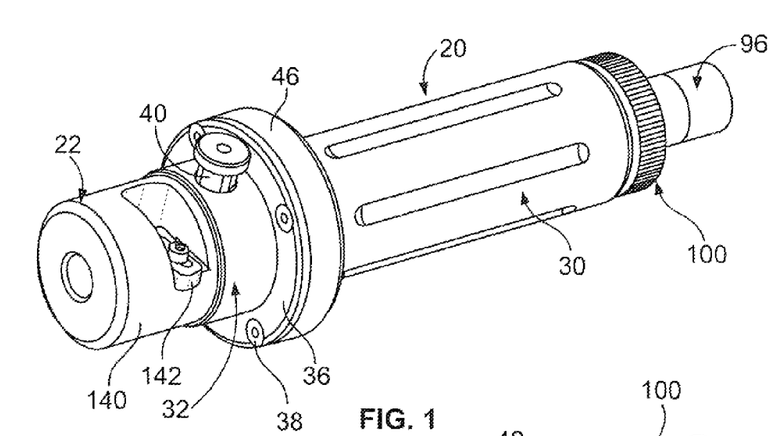
FIG. 1 is a perspective view of a cable stripper which incorporates the features of some example embodiments, and having a cutting assembly attached thereto.
Figure 2:
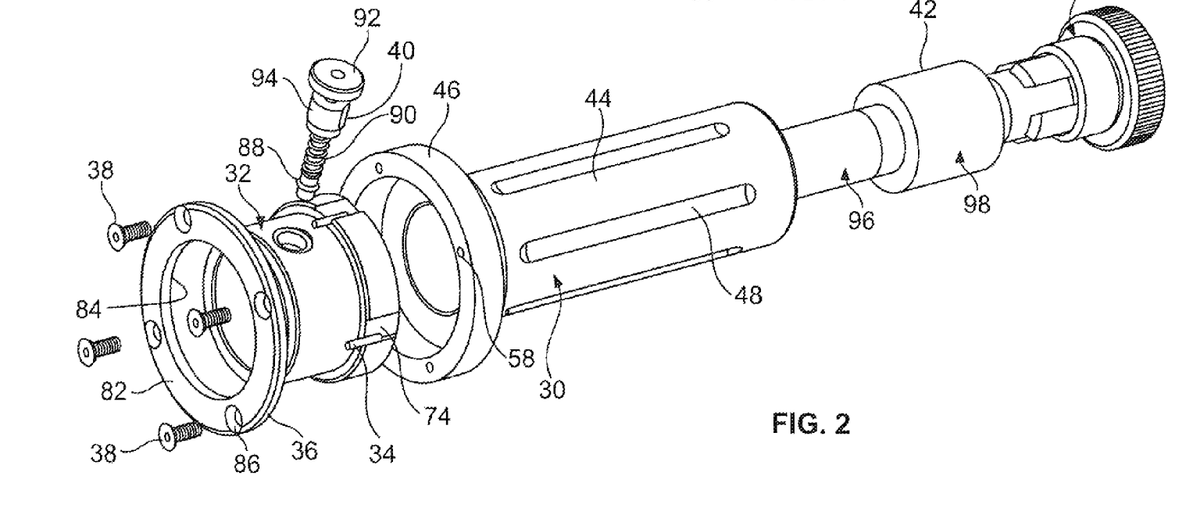
FIG. 2 is an exploded perspective view of the cable stripper.
Figure 3:
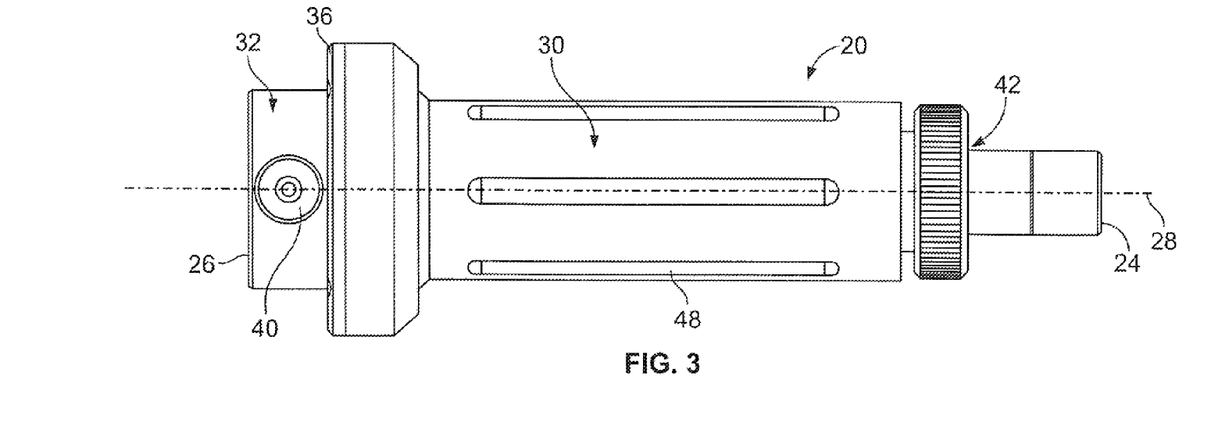
FIG. 3 is a side elevation view of the cable stripper.

The cable stripper 20 has first and second ends 24, 26 with a centerline 28 defined therebetween. The cable stripper 20 includes a handle 30, a one-way bearing 32, a plurality of pins 34 which are sandwiched between the handle 30 and the bearing 32, a washer 36 and a plurality of fasteners 38, such as conventional screws, for connecting the handle 30 and the bearing 32 together, a spring-loaded plunger 40 for connecting the cutting assembly 22 to the handle 30, and a depth stop assembly 42 mounted in the handle 30 for setting the amount of cable seated within the cable stripper 20 so that the cutting assembly 22 is positioned in the desired position. The pins 34 are conventional and are formed as cylinders.

Figure 4:
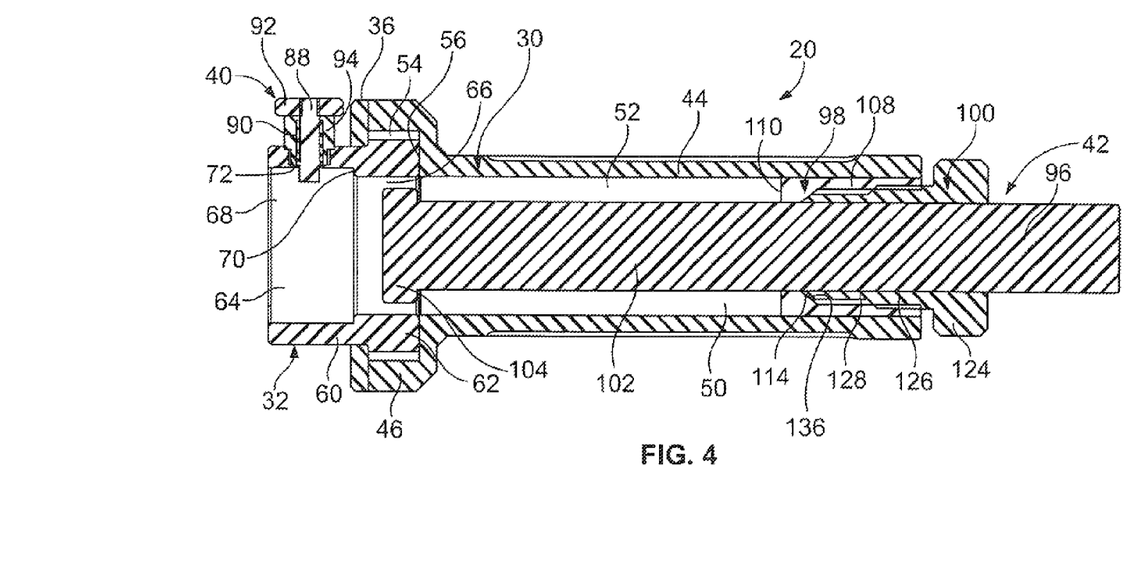
FIG. 4 is a cross-sectional view of the cable stripper.
Figure 5:
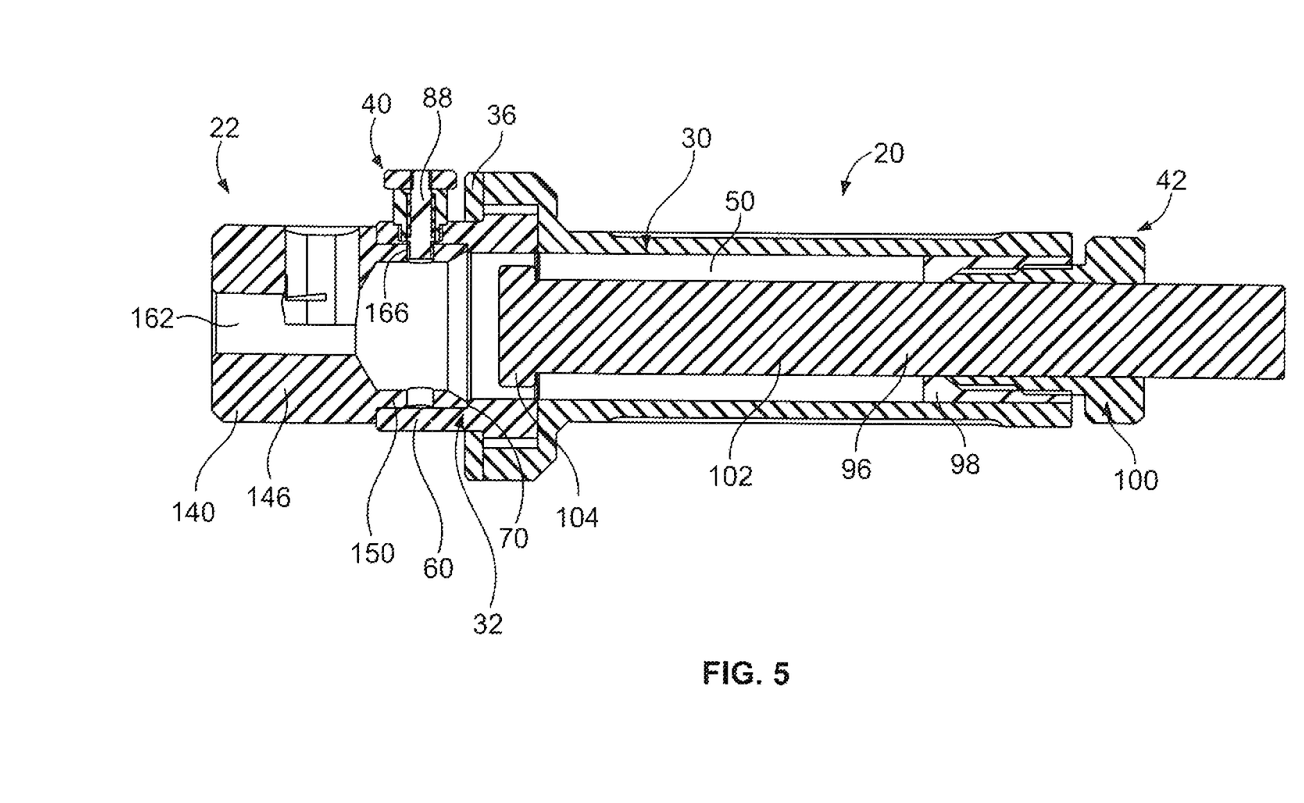
FIG. 5 is a cross-sectional view of the cable stripper and the cutting assembly.
Figure 6:
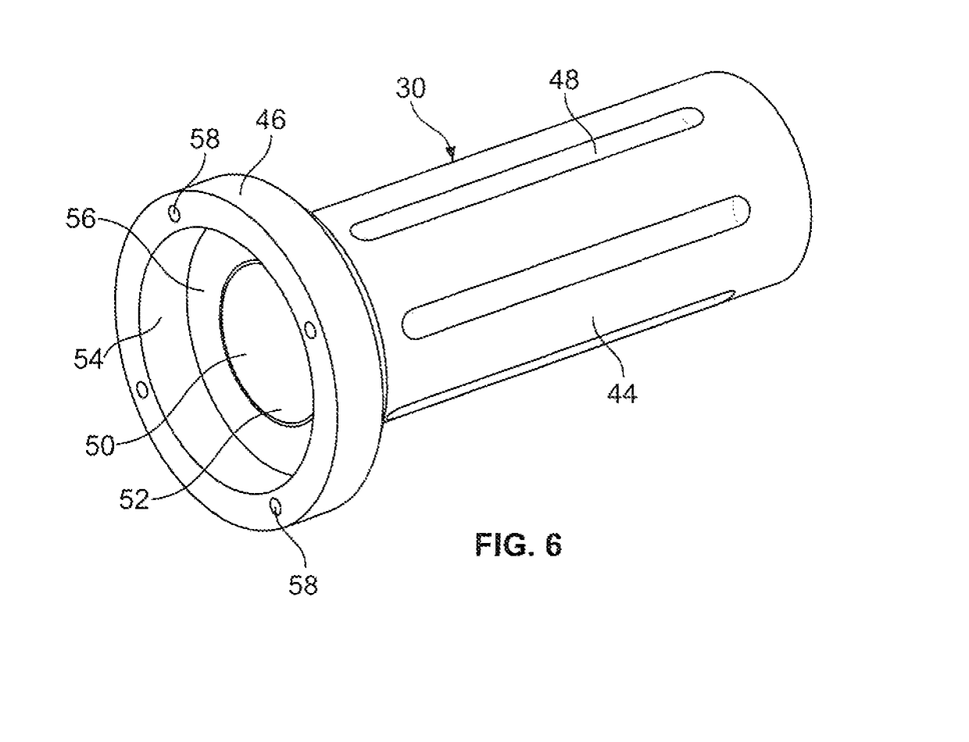
FIG. 6 is a perspective view of a handle of the cable stripper.
Figure 7:
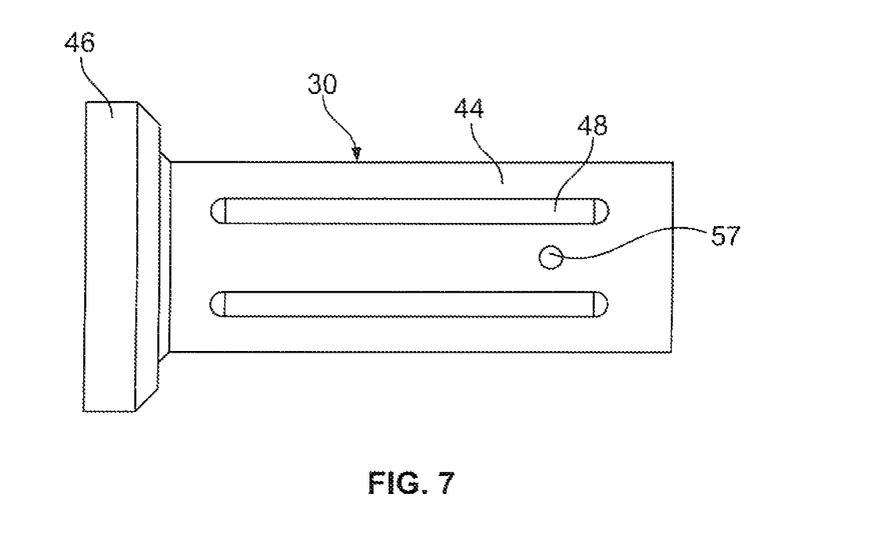
FIG. 7 is a side elevation view of the handle.

As best shown in FIGS. 4, 6 and 7, the handle 30 includes an elongated cylindrical body 44 having first and second ends, and a cylindrical collar 46 extending from the second end and outwardly from the body 44. The collar 46 has an outer diameter which is larger than the outer diameter of the body 44. The outer surface of the body 44 can have a plurality of spaced apart grooves 48 therein to allow for a user to easily grip the handle 30. Alternatively, the outer surface of the body 44 can be knurled. First, second and third inner walls define a central passageway 50 which extends through the body 44 and the collar 46. The central passageway 50 has a first portion 52 defined by the first inner wall and which extends through the body 44, and a second portion 54 defined by the second and third inner walls and which extends through the collar 46. The second portion 54 has a larger diameter than the diameter of the first portion 52 such that a shoulder 56 is defined by the second inner wall. A through-hole 57 is provided through the body 44 and is in communication with the central passageway 50. The through-hole 44 is proximate to, but spaced from, the first end of the body 44. A plurality of spaced apart blind bores 58 are provided in the second end of the collar 44.

Figure 8:
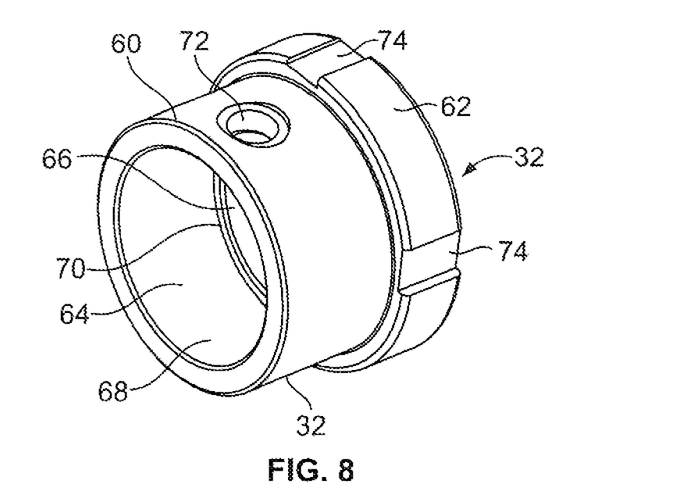
FIG. 8 is a perspective view of a one-way bearing of the cable stripper.
Figure 9:
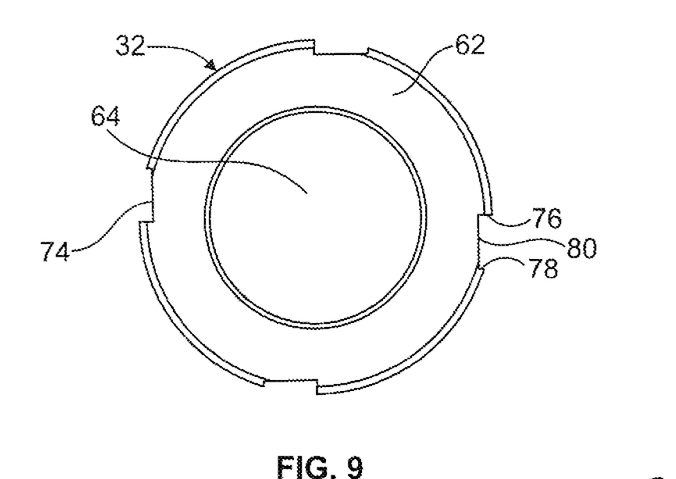
FIG. 9 is an end elevation view of the one-way bearing.

As best shown in FIGS. 4, 8 and 9, the one-way bearing 32 includes an elongated cylindrical body 60 having first and second ends, and a cylindrical collar 62 extending from the first end of the body 60 and outwardly therefrom. The collar 62 has an outer diameter which is larger than the outer diameter of the body 60. First, second and third inner walls define a central passageway 64 which extends through the body 60 and the collar 62. The first inner wall defines a first portion 66 of the central passageway 64 which extends through the collar 62, and the second inner wall defines a second portion 68 of the central passageway 64 which extends through the body 60. The first portion 66 has a smaller diameter than the diameter of the second portion 68 such that a shoulder 70 is defined in the central passageway 64 by the second inner wall. A through-hole 72 is provided through the body 60 and is in communication with the central passageway 64. The through-hole 72 is proximate to, but spaced from, the second end of the body 60.

The collar 62 of the one-way bearing 32 has a plurality of equi-distantly spaced apart pockets 74 formed therein which extend from the first end of the collar 62 to the second end of the collar 62. The pockets 74 may be formed by machining Each pocket 74 is defined by a first end wall 76 and a second end wall 78 which is spaced from the first end wall 76 by a base wall 80. In each pocket 74, the first end wall 76 extends radially outwardly from the center of the collar 62, and the second end wall 78 is parallel to the first end wall 76. The base wall 80 of each pocket 74 angles from the first end wall 76 to the second end wall 78; the end of the base wall 80 commencing at the first end wall 76 is spaced radially inwardly from the end of the base wall 80 commencing at the second end wall 78.

A pin 34 is placed into each pocket 74 such that the pin 34 can roll along the base wall 80 of the respective pocket 74 and between the end walls 76, 78. The collar 62 of the bearing 32 seats in the second portion 54 of the central passageway 50 of the handle 30 such that the first end of the collar 62 abuts against the shoulder 56. The second portion 54 of the central passageway 50 of the handle 30 has a diameter which is just slightly larger than outer diameter of the collar 62 of the bearing 32. The first end of each pin 34 abuts against the shoulder 56 which prevents the pins 34 from falling out of the first end of the pockets 74.

The washer 36 is formed of a circular body 82 having a central passageway 84. A plurality of spaced apart through-holes 86 are provided through the body 82. The washer 36 seats around the body 60 of the bearing 32 and abuts against the second end of the collar 62 of the bearing 32 and the second end of the collar 46 of the handle 30. The through-holes 86 in the washer 36 align with the blind bores 58 in the collar 46 of the handle 30 and the fasteners 38 are seated therein to mate the bearing 32 and the handle 30 together. The second ends of the pins 34 abut against the washer 36 to prevent the pins 34 from falling out of the second end of the pockets 74. Thus, the pins 34 are trapped in the pockets 74.

The central passageways 50, 64 align with each other to form a continuous passageway through the cable stripper 20.

The spring-loaded plunger 40 is attached to the bearing 32 and is used to mount the cutting assembly 22 to the cable stripper 20 as described herein. The spring-loaded plunger 40 is conventional and generally includes a shaft 88 around which a spring 90 is seated, a head 92 on the end of the shaft 88 and a housing 94 into which the shaft 88 and spring 90 are mounted. The spring 90 is trapped on the shaft 88 by the head 92 and the housing 94. The shaft 88 extends through a passageway in the housing 94. The spring-loaded plunger 40 is mounted on the body 60 of the bearing 32 with the shaft 88 extending through the through-hole 72 and into the second portion 68 of the central passageway 64.

The depth stop assembly 42 is mounted in the handle 30 and includes a rod 96, a sleeve 98 and a locking clamp 100. The depth stop assembly 42 is hand-tightenable to set a depth stop for the cable stripping length requirements. This eliminates the need for secondary tools to set the depth.

Figure 10:
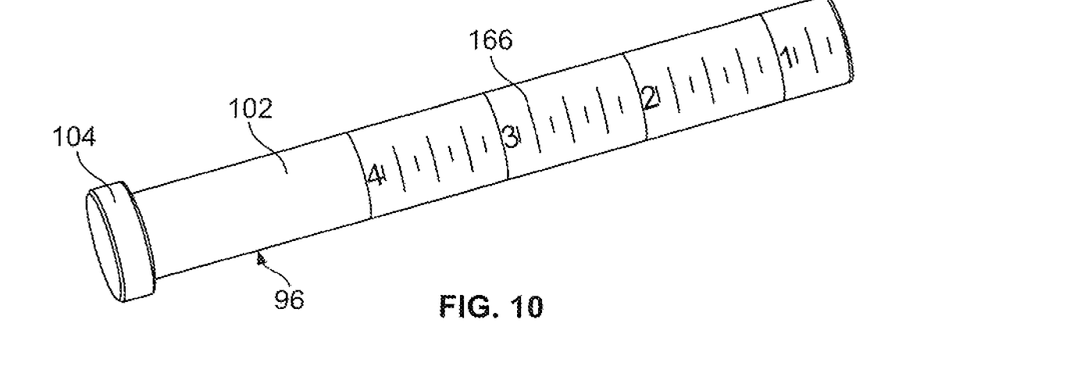
FIG. 10 is a perspective view of a rod of a depth stop assembly of the cable stripper.

As best shown in FIGS. 4 and 10, the rod 96 is formed of an elongate shaft 102 with an enlarged head 104 at an end thereof. The head 104 has an outer diameter which is larger than the outer diameter of the shaft 102. The head 104 and a portion of the shaft 102 seats in the first portion 52 of the central passageway 50 through the handle 30 and the shaft 102 extends outwardly from the first end of the handle 30. The rod 96 can be slid within the central passageway 50 to move the head 104 to different positions within the handle 30. A plurality of markings 106 are provided on the shaft 102 to allow a user to visually determine the position of the head 104 within the central passageway 50. As shown, the shaft 102 is cylindrical to mate with the cylindrical profile of the central passageway 50. It is to be understood that other (e.g., non-cylindrical) profiles can be used for the shaft 102 and central passageway 50, provided the two components can be slid relative to each other and that the shape of a cable is accommodated in the central passageway 50.

Figure 11:
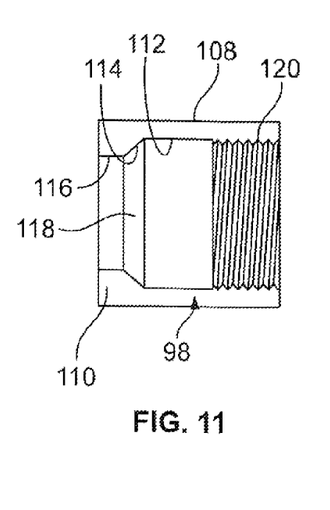
FIG. 11 is a cross-sectional view of a sleeve of the depth stop assembly.
Figure 12:
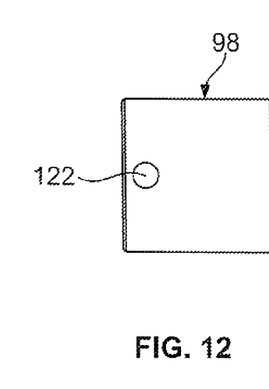
FIG. 12 is side elevation view of the sleeve.

As best shown in FIGS. 11 and 12, the sleeve 98 is formed of a body 108 having an end wall 110 at one end thereof. First, second and third inner walls 112, 114, 116 define a central passageway 118 which extends through the body 108 and the end wall 110. The first inner wall 112 has threads along a section thereof which extends from the first end of the body. The first inner wall 112 defines a first portion of the central passageway 118 which extends from the first end of the body 108, the second inner wall 114 defines a second portion of the central passageway 118 and extends from the end of the first portion, the third inner wall 116 defines a third portion of the central passageway and extends from the opposite end of the second portion. The first inner wall 112 has a diameter which is larger a diameter defined by the third inner wall 116. The second inner wall 114 tapers inwardly from the first inner wall 112 to the third inner wall 116. A through-hole 122 is provided through the body 108 proximate to the second end thereof.

Figure 13:
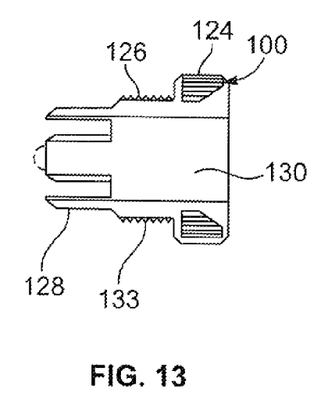
FIG. 13 is a cross-sectional view of a locking clamp of the depth stop assembly.
Figure 14:
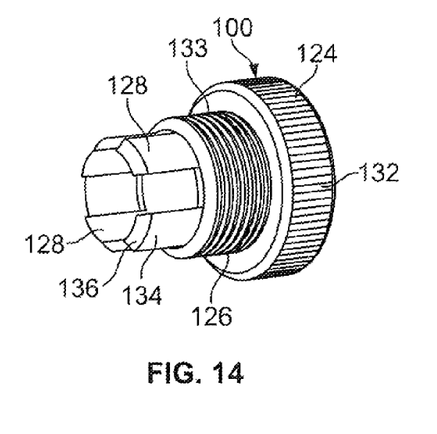
FIGS. 14 and 15 are perspective views of the locking clamp.
Figure 15:
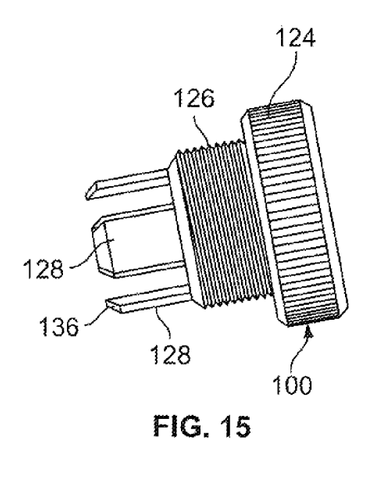
Figure 16:
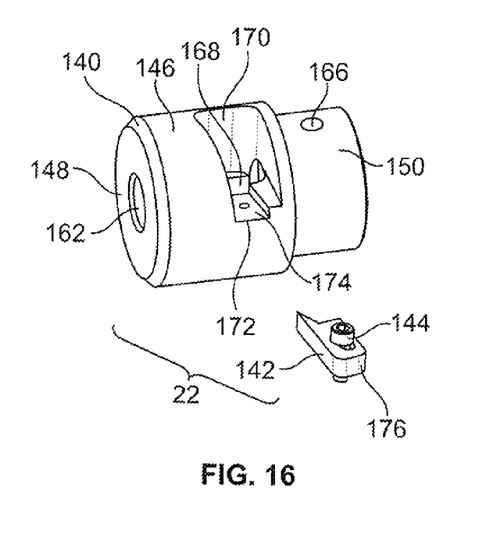
FIG. 16 is an exploded perspective view of the cutting assembly which includes a bushing and a blade.
Figure 17:
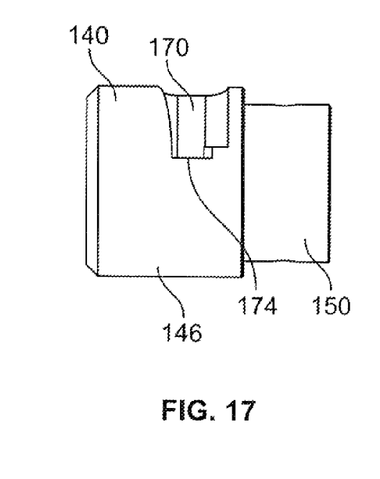
FIG. 17 is a side elevation view of the bushing.
Figure 18:
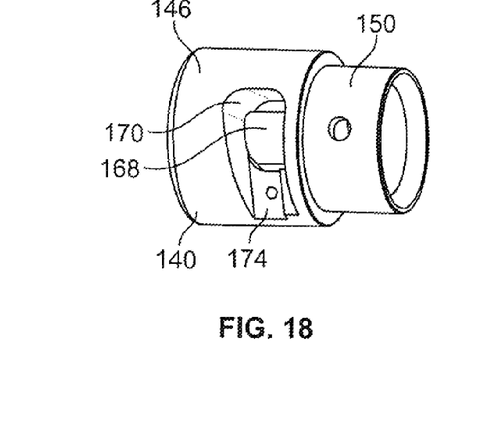
FIG. 18 is a perspective view of the bushing.

As best shown in FIGS. 13-15, the locking clamp 100 has a head 124, a body 126 extending from the head 124 and a plurality of spaced apart fingers 128 extending from the body 126. A constant diameter central passageway 130 extends through the locking clamp 100 from the first end to the second end. The head 124 has an outer diameter which is greater than the outer diameter of the body 126. The head 124 has a plurality of ridges 132 provided thereon to allow a user to easily grip the locking clamp 100. The body 126 has threads 133 on its exterior surface. Each finger 128 is arcuate in plan view and has a constant thickness body portion 134 with an end portion 136 that tapers inwardly. The angle of the taper of the end portion 36 generally conforms with the angle of the taper of the second inner wall 114 in the sleeve 98.

To assemble the depth stop assembly 42 with the handle 30, the rod 96 is seated through the sleeve 98 such that the head 104 of the rod 96 is proximate to the end portions 136 of the fingers 128. The combined rod 96 and sleeve 98 are seated within the first portion 52 of the central passageway 50 of the handle 30 such that the first end of the sleeve 98 aligns with the first end of the handle 30 and the rod shaft 102 extends at least partially outwardly from the first end of the handle 30. The through-hole 57 through the body 44 of the handle 30 and the through-hole 122 through the body 108 of the sleeve 98 are aligned with each other and a locking pin 138 is seated therein to mate the handle 30 and the sleeve 98 together and to prevent relative movement between the handle 30 and the sleeve 98.

The locking clamp 100 is slid over the first end of the shaft 102 and along the shaft 102 until the fingers 128 seat between the shaft 102 and the handle 30. To lock the rod 96 into a desired position relative to the handle 30, the threads 133 on the locking clamp 100 are engaged with the threads 120 on the sleeve 98. As the threads 120, 133 engage, the fingers 128 are moved toward the second wall 114 of the sleeve 98 and engage with the second wall 114. As the fingers 128 are moved further into engagement with the second wall 114, the angles on the fingers 128 and on the second wall 114 causes the fingers 128 to move radially inwardly to grip the shaft 102 of the rod 96. This fixes the rod 96 in place axially and prevents the relative movement between the rod 96 and the handle 30. The threading action of the locking clamp 100 allows the user to exhibit force in a linear fashion through twisting the locking clamp 100, which in turn presses the fingers 128 to lock on to the rod shaft 102 to provide a positive stop to a cable strip length.

The rod 96 can be easily repositioned by unscrewing the locking clamp 100 until the fingers 128 expand radially outwardly and the rod 96 is released for movement. Once the rod 96 is moved to the next desired position, the locking clamp 100 is re-engaged to lock the position of the rod 96 relative to the handle 30.

The cutting assembly 22 is mounted to the cable stripper 20 and is used to cut the cable seated in the cable stripper 20. As best shown in FIGS. 16-21, the cutting assembly 22 includes a bushing 140 and a blade 142 attached thereto by a fastener 144. The bushing 140 is of a predetermined size, which is dependent on the size of the cable to be seated therein.

The bushing 140 is formed of a body 146 having an end wall 148 at a second end thereof, and a collar 150 extending from a first end of the body 146. The body 146 has an outer diameter which is larger than the outer diameter of the collar 150. First, second, third, fourth and fifth inner walls 152, 154, 156, 158, 160 define a central passageway 162 which extends through the collar 150, the body 146 and the end wall 148. A centerline 164 extends along the center of the central passageway 162. The first, second and third inner walls 152, 154, 156 defines a first portion of the central passageway 162 which extends through the collar 150, and the fourth and fifth inner walls 158, 160 defines a second portion of the central passageway 162 which extends through the body 146. The first inner wall 152 tapers inwardly from the first end of the collar 150. The second inner wall 154 extends rearwardly from the second end of the first inner wall 152 and is parallel to the centerline 164. The third inner wall 156 tapers outwardly from the second inner wall 154. The fourth inner wall 158 extends rearwardly from the second end of the third inner wall 156 and is parallel to the centerline 164. The fifth inner wall 160 tapers outwardly from the fourth inner wall 158. The first inner wall 154 defines a diameter which is larger than the diameter defined by the fourth inner wall 158. A through-hole 166 is provided through the collar 160 proximate to the first end thereof and are in communication with the first portion of the central passageway 162. A through-passageway 168 is provided through the body 146 and is in communication with the second portion of the central passageway 162. The through-passageway 168 is defined by a wall 170. The centerline of the through-passageway 168 is perpendicular to the centerline 164. A recess 172 is provided in the body 146 and is proximate to the through-passageway 168. The recess 172 provides a seat surface 174 onto which the blade 142 is mounted. The seat surface 174 is parallel to a plane defined by the centerline 164.

Figure 19:
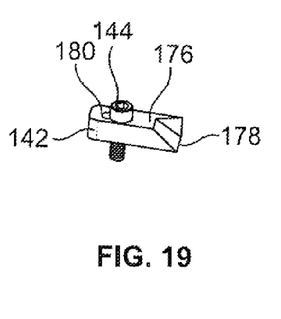
FIG. 19 is a perspective view of the blade.
Figure 20:
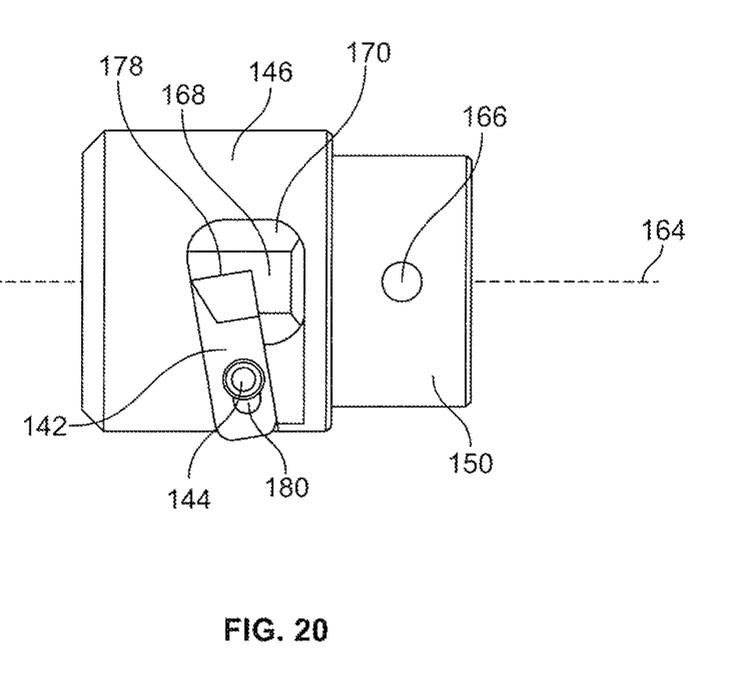
FIG. 20 is a top plan view of the cutting assembly.
Figure 21:
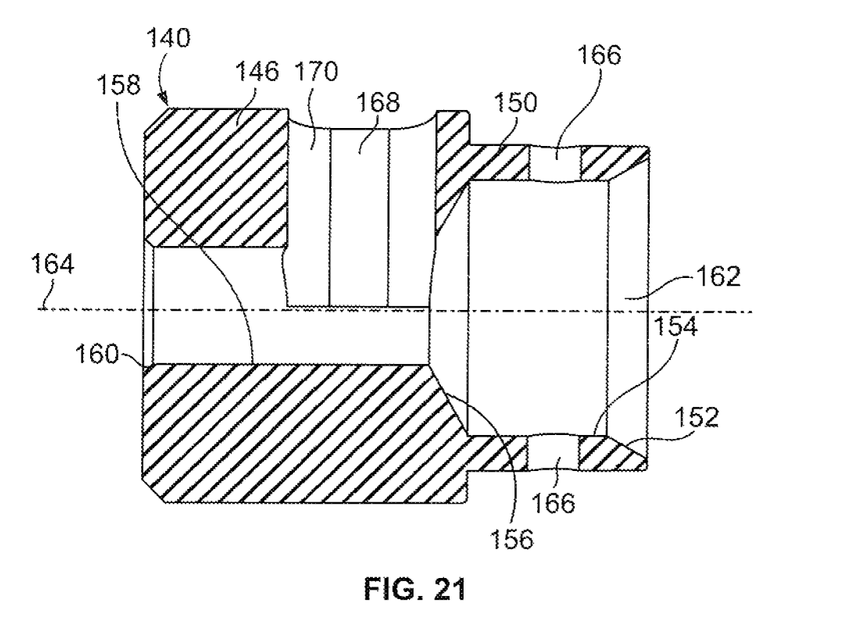
FIGS. 21 and 22 are cross-sectional views of the bushing.
Figure 22:
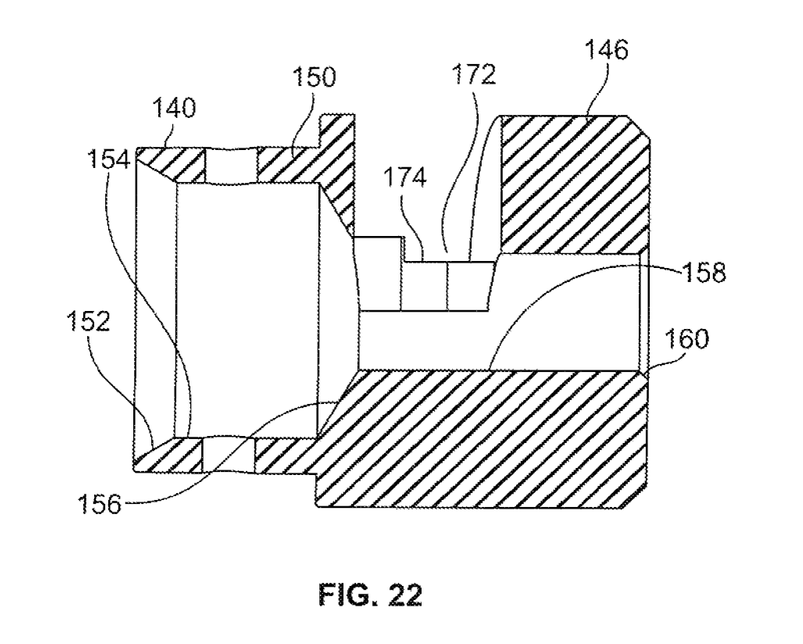
Figure 23:
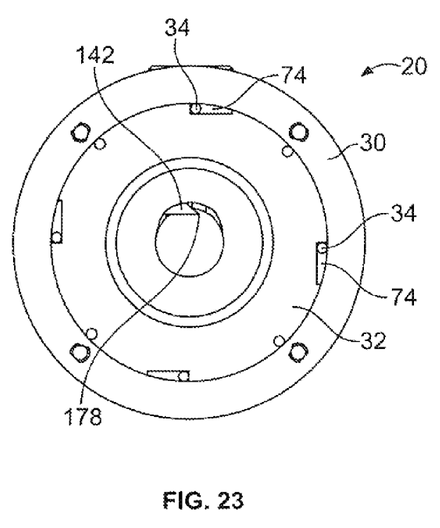
FIGS. 23-26 are cross-sectional views of the cable stripper and cutting assembly.
Figure 24:
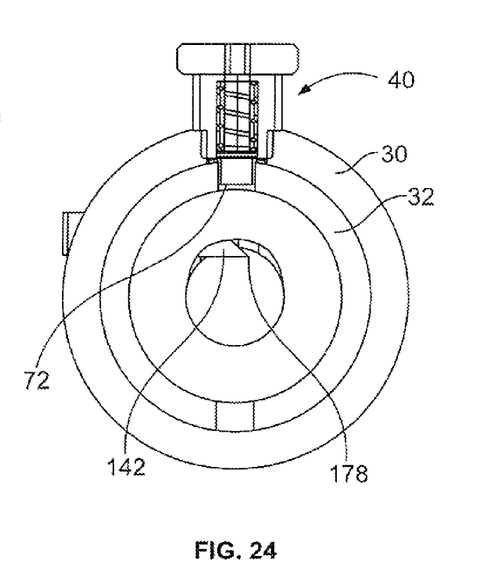
Figure 25:
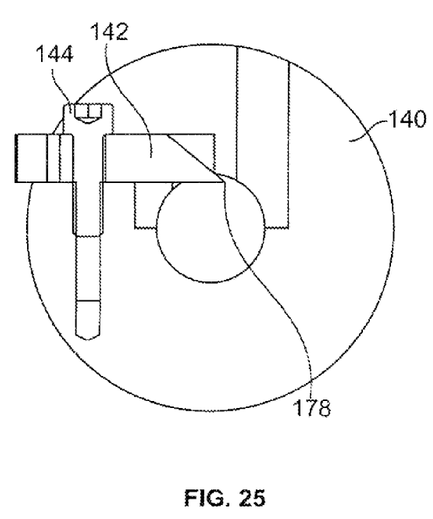
Figure 26:
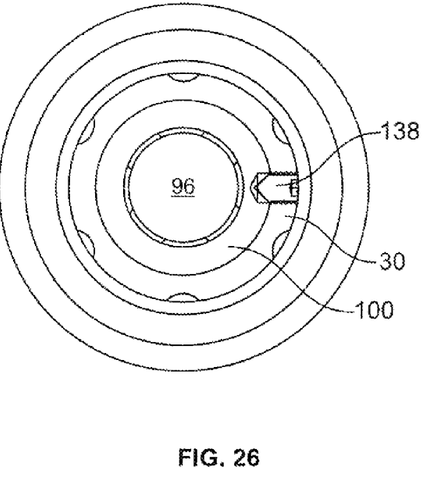

As best shown in FIG. 19, the blade 142 has a body portion 176 with a cutting edge 178 at an end thereof. An elongated aperture 180 is provided through the body portion 176. The blade 142 mounts on the seat surface 174 such that the cutting edge 178 is angled relative to the centerline 164 of the bushing 140. The cutting edge 178 extends into the through-passageway 168 and into the second portion of the central passageway 162 as best shown in FIGS. 24 and 25. A fastener 144 secures the body portion 176 to the bushing 140 through the elongated aperture 180. When the fastener 144 is loosened, the body portion 176 can be slid along the seat surface 174 to change the position of the cutting edge 178 relative to the cable mounted in the cutting assembly 22; the size of the elongated aperture 180 limits the amount of travel of the body portion 176. Once in a desired position, the fastener 144 is retightened to secure the body portion 176 in the desired position.

The cutting assembly 22 is attached to the cable stripper 20 by inserting the collar 150 of the cutting assembly 22 into the body 60 of the bearing 32 until the first end of the cutting assembly 22 engages the shoulder 70. The shaft 88 of the spring-loaded plunger 40 engages through the through-hole 166 in the bushing 140 to mate the bushing 140 and the bearing 32 together. The central passageways 50, 64, 118, 162 align. When a cable is inserted through the cutting assembly 22 and into the cable stripper 20, the shaft 88 of the spring-loaded plunger 40 also bears against the cable. The cutting assembly 22 is easily released from the cable stripper 20 by retracting the shaft 88 of the spring-loaded plunger 40 out of the through-hole 166 and pulling the cutting assembly 22 outwardly from the cable stripper 20. Differently sized cutting assemblies can be easily and quickly mounted to and disassembled from the remainder of the cable stripper 20.

After the depth stop assembly 42 is positioned in the desired position, the cable to be cut/stripped is inserted into the second end of the cutting assembly 22, through the cutting assembly 22, through the one-way bearing 32 and into the handle 30 until the end of the cable abuts the head 104 of the rod 96. The cable is then secured in the cable stripper 20 by its engagement with the spring-loaded plunger 40. The blade 142 engages with the cable to hold the cable in the cable stripper 20.

To cut the cable, a ratcheting-type action is used. The handle 30 is rotated relative to the bearing 32. During clockwise motion, the pockets 74 in the bearing 32 provide space for the pins 34 to roll freely. During counterclockwise rotation, the friction of the pins 34 between the bearing 32 and the handle 30 allow torque to be transferred from the handle 30 to the bearing 32, which provides a torque transmission to the bushing 140. Since a one-way bearing 32 is provided, the user can only use the cable stripper 20 in the intended direction.

While particular embodiments are illustrated in and described with respect to the drawings, it is envisioned that those skilled in the art may devise various modifications without departing from the spirit and scope of the appended claims. It will therefore be appreciated that the scope of the disclosure and the appended claims is not limited to the specific embodiments illustrated in and discussed with respect to the drawings and that modifications and other embodiments are intended to be included within the scope of the disclosure and appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the disclosure and the appended claims.

What is claimed is:

1. A tool for cutting a cable comprising:
   a bearing having a first end and a second end, an outer surface having a plurality of pockets therein, and a passageway extending through said bearing from said first end to said second end, said passageway for receiving the cable therein;
   a handle rotatably attached to the first end of the bearing;
   a pin mounted in each said pocket such that the pins are between the bearing and the handle; and
   a cutting assembly comprising a bushing having a blade attached thereto, said bushing having a first end and a second end and a passageway extending through said bushing from said first end to said second end for receiving the cable therein, said bushing is non-rotationally attached to the second end of the bearing;
   wherein during a rotational motion of the handle relative to the bearing in a first direction the pins roll freely in the pockets to allow relative movement between the handle and the bearing, and during a rotational motion of the handle relative to the bearing in a second direction which is opposite to said first direction, the pins frictionally engage the bearing and the handle to transfer torque from the handle to the bearing and the bushing.

2. The tool of claim 1, wherein each pocket comprises an angled base wall upon which the pin mounted in the respective pocket rolls along.

3. The tool of claim 2, wherein each pocket further comprises a first end wall and a second end wall which is spaced from the first end wall by the base wall, the first end wall extends radially outwardly from a center of the bearing, and the second end wall is parallel to the first end wall, and the base wall angles from the first end wall to the second end wall such that a first end of the base wall at the first end wall is spaced radially inwardly from a second end of the base wall at the second end wall.

4. The tool of claim 1, wherein said bearing and said cutting assembly are attached together by a spring-loaded plunger.

5. The tool of claim 1, wherein a plurality of differently sized cutting assemblies are attachable to the bearing.

6. The tool of claim 1, wherein said blade extends into said passageway of said bushing.

7. The tool of claim 1, wherein a depth stop assembly is attached to said handle, said depth stop assembly being operably configured to enable setting an amount of cable seated within the cutting assembly so that the cutting assembly is positioned in a desired position relative to the cable.

8. The tool of claim 7, wherein said handle has a first end and a second end and a passageway extending through said handle from said first end to said second end, and said depth stop assembly includes a sleeve having a passageway therethrough, said sleeve seated within the passageway of the handle, a rod seated within the passageway of the handle and extending through said passageway of said sleeve, and a locking clamp positioned between said rod and said sleeve for fixing the position of the rod relative to the sleeve.

9. The tool of claim 8, wherein said locking clamp is hand-tightenable.

10. The tool of claim 8, wherein the rod extends outwardly from the first end of the handle and includes a plurality of markings thereon.

11. The tool of claim 8, wherein said passageway of said sleeve has a tapered surface, and the locking clamp comprises a head, a body extending from the head and a plurality of spaced apart fingers extending from the body, each said finger having a tapered end portion, said taper of each said end portion generally conforms with the tapered surface of said sleeve.

12. The tool of claim 11, wherein said head has an outer diameter which is greater than an outer diameter of the body, said head has a gripping surface thereon.

13. The tool of claim 11, wherein said locking clamp and said sleeve are threadedly engaged.

* * * * *